(12) United States Patent
Hasegawa et al.

(10) Patent No.: US 10,422,015 B2
(45) Date of Patent: Sep. 24, 2019

(54) HIGH-STRENGTH GALVANIZED STEEL SHEET EXCELLENT IN STRETCH-FLANGE FORMABILITY, IN-PLANE STABILITY OF STRETCH-FLANGE FORMABILITY, AND BENDABILITY AND METHOD FOR MANUFACTURING THE SAME

(71) Applicant: JFE STEEL CORPORATION, Tokyo (JP)

(72) Inventors: Hiroshi Hasegawa, Fukuyama (JP); Koichiro Fujita, Nagoya (JP)

(73) Assignee: JFE Steel Corporation, Tokyo (JP)

( * ) Notice: Subject to any disclaimer, the term of this patent is extended or adjusted under 35 U.S.C. 154(b) by 342 days.

(21) Appl. No.: 15/507,037

(22) PCT Filed: Aug. 14, 2015

(86) PCT No.: PCT/JP2015/004049
§ 371 (c)(1),
(2) Date: Feb. 27, 2017

(87) PCT Pub. No.: WO2016/031165
PCT Pub. Date: Mar. 3, 2016

(65) Prior Publication Data
US 2017/0275726 A1  Sep. 28, 2017

(30) Foreign Application Priority Data

Aug. 28, 2014 (JP) ................. 2014-174410

(51) Int. Cl.
| | | |
|---|---|---|
| C22C 38/00 | (2006.01) | |
| C21D 9/46 | (2006.01) | |
| C22C 38/14 | (2006.01) | |
| C22C 38/58 | (2006.01) | |
| C21D 8/02 | (2006.01) | |
| C22C 38/02 | (2006.01) | |
| C22C 38/06 | (2006.01) | |
| C23C 2/06 | (2006.01) | |
| C23C 2/28 | (2006.01) | |
| C22C 38/04 | (2006.01) | |
| C22C 38/08 | (2006.01) | |
| C22C 38/12 | (2006.01) | |
| C22C 38/16 | (2006.01) | |
| C22C 38/28 | (2006.01) | |
| C22C 38/32 | (2006.01) | |
| C22C 38/38 | (2006.01) | |
| B32B 15/01 | (2006.01) | |
| C21D 8/04 | (2006.01) | |
| C21D 6/00 | (2006.01) | |

(52) U.S. Cl.
CPC .............. *C21D 9/46* (2013.01); *B32B 15/013* (2013.01); *C21D 8/0263* (2013.01); *C21D 8/0463* (2013.01); *C21D 8/0473* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/28* (2013.01); *C22C 38/32* (2013.01); *C22C 38/38* (2013.01); *C22C 38/58* (2013.01); *C23C 2/06* (2013.01); *C23C 2/28* (2013.01); *C21D 6/005* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 2010/0043925 A1 | 2/2010 | Sun | |
| 2010/0314009 A1 | 12/2010 | Kaneko et al. | |
| 2011/0008647 A1 | 1/2011 | Azuma et al. | |
| 2011/0240176 A1 | 10/2011 | Kaneko et al. | |
| 2012/0040203 A1 | 2/2012 | Takagi et al. | |
| 2013/0048161 A1* | 2/2013 | Matsuda | C21D 1/22 148/653 |
| 2016/0017473 A1 | 1/2016 | Takagi et al. | |

FOREIGN PATENT DOCUMENTS

| | | |
|---|---|---|
| CN | 102227511 A | 10/2011 |
| CN | 103717774 A | 4/2014 |
| EP | 2233597 A1 | 9/2010 |
| EP | 2371979 A1 | 10/2011 |
| EP | 2460901 A1 | 6/2012 |
| EP | 2738276 A1 | 6/2014 |
| EP | 2757171 A1 | 7/2014 |
| EP | 2881481 A1 | 6/2015 |
| JP | 2007070659 A | 3/2007 |
| JP | 2009179852 A | 8/2009 |
| JP | 2010255094 A | 11/2010 |

(Continued)

OTHER PUBLICATIONS

Extended European Search Report for European Application No. 15834834.2, dated Oct. 25, 2017, 13 pages.

(Continued)

*Primary Examiner* — Anita Nassiri-Motlagh
(74) *Attorney, Agent, or Firm* — RatnerPrestia

(57) ABSTRACT

Provided are a high-strength galvanized steel sheet containing 0.12% to 0.25% C, 0.01% to 1.00% Si, 1.5% to 4.0% Mn, 0.100% or less P, 0.02% or less S, 0.01% to 0.10% Al, 0.001% to 0.010% N, 0.005% to 0.100% Ti, and 0.0005% to 0.0050% B, the remainder being Fe and inevitable impurities, Ti>4N being satisfied. The high-strength galvanized steel sheet contains 80% to 100% martensite in terms of area fraction, 5% or less (including 0%) polygonal ferrite in terms of area fraction, and less than 3% (including 0%) retained austenite in terms of area fraction. The average hardness of martensite is 400 to 500 in terms of Vickers hardness (Hv). The average grain size of martensite is 20 μm or less. The standard deviation of the grain size of martensite is 7.0 μm or less.

20 Claims, No Drawings

(56) References Cited

FOREIGN PATENT DOCUMENTS

| | | |
|---|---|---|
| JP | 2010275628 A | 12/2010 |
| JP | 2011032549 A | 2/2011 |
| JP | 2012012703 A | 1/2012 |
| JP | 2012237042 A | 12/2012 |
| JP | 2014005514 A | 1/2014 |
| WO | 2014020640 A1 | 2/2014 |

OTHER PUBLICATIONS

International Search Report and Written Opinion for International Application No. PCT/JP2015/004049, dated Nov. 2, 2015, 5 pages.
Chinese Office Action for Chinese Application No. 2015800467331, dated Dec. 20, 2017, including Concise Statement of Search Report, 7 pages.

* cited by examiner

HIGH-STRENGTH GALVANIZED STEEL SHEET EXCELLENT IN STRETCH-FLANGE FORMABILITY, IN-PLANE STABILITY OF STRETCH-FLANGE FORMABILITY, AND BENDABILITY AND METHOD FOR MANUFACTURING THE SAME

CROSS REFERENCE TO RELATED APPLICATIONS

This is the U.S. National Phase application of PCT International Application No. PCT/JP2015/004049, filed Aug. 14, 2015, and claims priority to Japanese Patent Application No. 2014-174410, filed Aug. 28, 2014, the disclosures of each of these applications being incorporated herein by reference in their entireties for all purposes.

FIELD OF THE INVENTION

The present invention relates to a high-strength galvanized steel sheet, suitable for use as an automotive steel sheet, excellent in stretch-flange formability, in-plane stability of stretch-flange formability, and bendability and also relates to a method for manufacturing the same. As used herein, the term "galvanized steel sheet" includes a galvannealed steel sheet.

BACKGROUND OF THE INVENTION

From the viewpoint of global environmental protection, it is always an important issue for the automotive industry that in order to reduce $CO_2$ emissions, automotive fuel efficiency is improved by reducing the weight of automobile bodies with the strength thereof maintained. The reduction in thickness of steel sheets, which are materials for automotive parts, by strengthening the steel sheets is effective in reducing the weight of automobile bodies with the strength thereof maintained. Most of automotive parts made from steel sheets are formed by pressing, burring, or the like. Therefore, high-strength steel sheets used as materials for automotive parts are required to have desired strength and, furthermore excellent formability. In recent years, ultra-high-strength steel sheets with a tensile strength of 1,300 MPa or more have been increasingly used as framework materials for automobile bodies. Upon forming the ultra-high-strength steel sheets, excellent stretch-flange formability and bendability are necessary. Against such a background, various ultra-high-strength steel sheets excellent in formability have been developed. However, increasing the content of an alloying element in steel for the purpose of achieving high strength causes the in-plane variation of formability, particularly stretch-flange formability. As a result, there is a problem in that materials having sufficient properties cannot be provided. Thus, it is very important to solve the problem.

Patent Literature 1 discloses a technique relating to a high-strength cold-rolled steel sheet excellent in elongation and stretch-flange formability. However, the in-plane variation of stretch-flange formability is not evaluated. Therefore, it is uncertain that the high-strength cold-rolled steel sheet has sufficient in-plane stability of stretch-flange formability.

Patent Literature 2 discloses a technique relating to a high-strength galvanized steel sheet excellent in bendability. However, the strength thereof is low, about 1,000 MPa in terms of tensile strength (TS), and stretch-flange formability is not taken into account. There is room for improvement.

Patent Literature 3 discloses a technique relating to a high-strength galvanized steel strip with few variations in strength in the steel strip. However, variations in stretch-flange formability and bendability are not taken into account. There is room for improvement.

PATENT LITERATURE

PTL 1: Japanese Unexamined Patent Application Publication No. 2012-237042
PTL 2: Japanese Unexamined Patent Application Publication No. 2012-12703
PTL 3: Japanese Unexamined Patent Application Publication No. 2011-32549

SUMMARY OF THE INVENTION

Aspects of the present invention advantageously solve problems with the above conventional techniques. It is an object of aspects of the present invention to provide a high-strength galvanized steel sheet, suitable as material for automotive parts, excellent in stretch-flange formability, in-plane stability of stretch-flange formability, and bendability and a method for manufacturing the same.

In order to achieve the above described object and in order to manufacture a galvanized steel sheet which ensures high strength and which is excellent in stretch-flange formability, in-plane stability of stretch-flange formability, and bendability, the inventors have performed intensive investigations from the viewpoint of the composition and microstructure of steel sheets and methods for manufacturing the steel sheets. As a result, the inventors have found the following.

A TS of 1,300 MPa or more, excellent stretch-flange formability, excellent in-plane stability of stretch-flange formability, and excellent bendability can be achieved by adjusting the content of C to 0.12% to 0.25%, the content of Si to 0.01% to 1.00%, and the content of each of other alloying elements to an appropriate range and controlling the area fraction of martensite to 80% to 100%, the area fraction of polygonal ferrite to 5% or less (including 0%), the area fraction of retained austenite to less than 3% (including 0%), the average hardness of martensite to 400 to 500 in terms of Vickers hardness (Hv), and the grain size and grain size distribution of martensite to appropriate ranges, respectively. Furthermore, the inventors have found that there are good conditions for hot rolling, cold rolling, and annealing. The inventors have obtained good results also on rolling load. Aspects of the present invention have been made on the basis of these findings and these aspects of the invention below are provided.

[1] A high-strength galvanized steel sheet excellent in stretch-flange formability, in-plane stability of stretch-flange formability, and bendability has a composition which contains 0.12% to 0.25% C, 0.01% to 1.00% Si, 1.5% to 4.0% Mn, 0.100% or less P, 0.02% or less S, 0.01% to 0.10% Al, 0.001% to 0.010% N, 0.005% to 0.100% Ti, and 0.0005% to 0.0050% B on a mass basis, the remainder being Fe and inevitable impurities, and which satisfies Ti>4N (where Ti and N represent the mass percent of each element). The high-strength galvanized steel sheet contains 80% to 100% martensite in terms of area fraction, 5% or less (including 0%) polygonal ferrite in terms of area fraction, and less than 3% (including 0%) retained austenite in terms of area fraction. The average hardness of martensite is 400 to 500 in terms of Vickers hardness (Hv). The average grain size of martensite is 20 µm or less. The standard deviation of the grain size of martensite is 7.0 µm or less.

[2] The high-strength galvanized steel sheet, excellent in stretch-flange formability, in-plane stability of stretch-flange formability, and bendability, specified in Item [1] contains at least one selected from 0.005% to 2.0% Cr, 0.005% to 2.0% Mo, 0.005% to 2.0% V, 0.005% to 2.0% Ni, 0.005% to 2.0% Cu, and 0.005% to 2.0% Nb on a mass basis.

[3] The high-strength galvanized steel sheet, excellent in stretch-flange formability, in-plane stability of stretch-flange formability, and bendability, specified in Item [1] or [2] contains at least one selected from 0.001% to 0.005% Ca and 0.001% to 0.005% of a REM on a mass basis.

[4] A method for manufacturing a high-strength galvanized steel sheet which is excellent in stretch-flange formability, in-plane stability of stretch-flange formability, and bendability and which contains 80% to 100% martensite in terms of area fraction, 5% or less (including 0%) polygonal ferrite in terms of area fraction, and less than 3% (including 0%) retained austenite in terms of area fraction, the average hardness of martensite being 400 to 500 in terms of Vickers hardness (Hv), the average grain size of martensite being 20 µm or less, and the standard deviation of the grain size of martensite being 7.0 µm or less, includes a hot-rolling step in which a slab having the composition specified in any one of Items 1 to 3 is hot-rolled at a slab-reheating temperature or slab-furnace charging temperature of 1,100° C. or higher and a finish rolling temperature of 800° C. or higher, is cooled after the completion of finish rolling such that the residence time in a temperature range of 600° C. to 700° C. is 10 seconds or less in total, and is coiled at an average coiling temperature of 400° C. to lower than 600° C. such that the difference between an average value of coiling temperature in a 100 mm-wide region at a widthwise central position of the steel sheet and an average value of the coiling temperature in a 100 mm-wide region at a lateral edge position of the steel sheet is 70° C. or lower; a cold-rolling step of cold-rolling a hot-rolled sheet obtained in the hot-rolling step with a cumulative rolling reduction of more than 20%; an annealing step in which a cold-rolled sheet obtained in the cold-rolling step is heated to 700° C. or lower at an average heating rate of 5° C./s or more, is further heated to an annealing temperature at an average heating rate of 1° C./s or less, and is held at an annealing temperature of 780° C. to 1,000° C. for 30 seconds to 1,000 seconds; a cooling step of cooling the cold-rolled sheet at an average cooling rate of 3° C./s or more after the annealing step; a galvanizing step of galvanizing the cold-rolled sheet after the cooling step; and a post-plating cooling step of cooling the galvanized sheet after the galvanizing step such that the residence time in a temperature range of (Ms temperature—50° C.) to the Ms temperature is 2 seconds or more.

[5] The method, for manufacturing the high-strength galvanized steel sheet excellent in stretch-flange formability, in-plane stability of stretch-flange formability, and bendability, specified in Item [4] includes a galvannealing step of performing a galvannealing treatment by holding in a temperature range of 460° C. to 580° C. for 1 second to 40 second, the galvannealing step being after the galvanizing step and before the post-plating cooling step.

[6] The method, for manufacturing the high-strength galvanized steel sheet excellent in stretch-flange formability, in-plane stability of stretch-flange formability, and bendability, specified in Item [4] or [5] includes a tempering step of performing a tempering treatment at a temperature of 350° C. or lower after the post-plating cooling step.

In accordance with aspects of the present invention, the term "high-strength steel sheet" refers to a steel sheet with a tensile strength of TS 1,300 MPa or more, the term "stretch-flange formability" means that $\lambda$ is 15% or more and TS×$\lambda$ is 25,000 MPa·% or more, the term "in-plane stability of stretch-flange formability" means that the standard deviation of $\lambda$ is less than 4%, and the term "bendability" means that the maximum length of cracks is less than 0.5 mm, the cracks being caused in a ridge when a steel sheet with a thickness of 1.4 mm is subjected to a 90° V-bending test at a radius of 3.0 mm.

According to aspects of the present invention, the following sheet can be obtained: a high-strength galvanized steel sheet which is suitable as material for automotive parts, which has a TS of 1,300 MPa or more, and which is excellent in stretch-flange formability, in-plane stability of stretch-flange formability, and bendability.

DETAILED DESCRIPTION OF EMBODIMENTS OF THE INVENTION

Details of embodiments of the present invention are described below. The unit "%" used to express the content of each component or element refers to "mass percent" unless otherwise specified.

(1) Composition

C: 0.12% to 0.25%

C is an element which is necessary to produce martensite to increase TS. When the content of C is less than 0.12%, the strength of martensite is low and a TS of 1,300 MPa or more cannot be obtained. However, when the content of C is more than 0.25%, the deterioration of stretch-flange formability is significant. Thus, the content of C is set to 0.12% to 0.25%. From the viewpoint of TS and stretch-flange formability, the lower limit of the content of C is preferably set to 0.13% or more. From the same viewpoint, the upper limit of the content of C is preferably set to 0.23% or less.

Si: 0.01% to 1.00%

Si is an element which is effective in solid-solution-strengthening steel to increase TS. In order to obtain this effect, the content of Si needs to be 0.01% or more. However, when the content of Si is high, the excessive production of ferrite causes the reduction of stretch-flange formability and bendability and the deterioration of wettability and weldability and increases the rolling load to impair the sheet shape of a final product. Therefore, the addition of an appropriate amount thereof is preferable. In accordance with aspects of the present invention, from the main viewpoint of wettability, a Si content of up to 1.00% is acceptable. The content of Si is preferably set to 0.01% to 0.60% and more preferably 0.01% to 0.20%.

Mn: 1.5% to 4.0%

Mn is an element which solid-solution-strengthens steel to increase TS and which suppresses ferrite transformation and bainite transformation and produces martensite to increase TS. In order to sufficiently obtain such an effect, the content of Mn needs to be 1.5% or more. Furthermore, from the viewpoint of TS and stretch-flange formability, the lower limit of the content of Mn is preferably set to 1.8% or more and more preferably 2.0% or more. However, when the content of Mn is more than 4.0%, the increase in amount of inclusions is significant and the reduction of stretch-flange formability and the reduction in cleanliness of steel are caused. Thus, the content of Mn is set to 1.5% to 4.0%. From the viewpoint of TS and stretch-flange formability, the upper limit of the content of Mn is preferably set to 3.8% or less and more preferably 3.5% or less.

P: 0.100% or less

P deteriorates the bendability and the wettability by intergranular segregation and therefore the content thereof is preferably minimized. In accordance with aspects of the present invention, a P content of up to 0.100% is acceptable in terms of an upper limit. The lower limit thereof is not particularly limited and is preferably 0.001% or more because when the lower limit thereof is less than 0.001%, a reduction in production efficiency is caused.

S: 0.02% or less

S is present in the form of inclusions such as MnS to deteriorate the weldability and therefore the content thereof is preferably minimized. In accordance with aspects of the present invention, an S content of up to 0.02% is acceptable in terms of an upper limit. The lower limit thereof is not particularly limited and is preferably 0.0005% or more because when the lower limit thereof is less than 0.0005%, a reduction in production efficiency is caused.

Al: 0.01% to 0.10%

Al acts as a deoxidizing agent and is preferably added in a deoxidizing step. In order to obtain such an effect, the content of Al needs to be 0.01% or more. However, when the content of Al is more than 0.10%, the risk of slab cracking during continuous casting is increased, the excessive production of ferrite during annealing is caused, and the stretch-flange formability is reduced in some cases. Thus, the content of Al is set to 0.01% to 0.10%.

N: 0.001% to 0.010%

N is fixed to Ti. In order to exhibit an effect of B, N needs to be set to the range Ti>4N. When the content of N is more than 0.010%, TiN is excessive and the microstructure of the steel sheet according to aspects of the present invention is not obtained. However, when the content of N is less than 0.001%, a reduction in production efficiency is caused. Therefore, the content of N is preferably 0.001% or more.

Ti: 0.005% to 0.100%

Ti is an element which is effective in suppressing the recrystallization of ferrite during annealing to refine grains. In order to obtain such an effect, the content of Ti needs to be 0.005% or more. The lower limit of the content of Ti is preferably 0.010% or more. However, when the content of Ti is more than 0.100%, this effect is saturated and cost increases are caused. Furthermore, coarse precipitates are formed and the refinement of grains is prevented in some cases. Thus, the content of Ti is set to 0.005% to 0.100%. From the viewpoint of grain refinement, the upper limit of the content of Ti is preferably set to 0.080% or less and more preferably 0.060% or less.

B: 0.0005% to 0.0050%

B is an element which segregates at grain boundaries, which suppresses the production of ferrite and bainite, and which is effective in promoting the production of martensite. In order to sufficiently obtain such an effect, the content of B needs to be 0.0005% or more. However, when the content of B is more than 0.0050% or more, this effect is saturated and cost increases are caused. Thus, the content of B is set to 0.0005% to 0.0050%. From the viewpoint of the production of martensite, the content of B is preferably set to 0.0005% to 0.0030% and more preferably 0.0005% to 0.0020%.

Ti>4N (where Ti and N represent the mass percent of each content)

Ti is an element which fixes N to suppress the production of BN and which is effective in exhibiting an effect of B. In order to obtain such an effect, the content of Ti and the content of N need to satisfy Ti>4N.

The remainder are Fe and inevitable impurities. One or more elements below may be appropriately contained as required.

At least one selected from 0.005% to 2.0% Cr, 0.005% to 2.0% Mo, 0.005% to 2.0% V, 0.005% to 2.0% Ni, 0.005% to 2.0% Cu, and 0.005% to 2.0% Nb Cr, Mo, V, Ni, Cu, and Nb are elements which are effective in producing a low-temperature transformed phase such as martensite to achieve high strength. In order to obtain such an effect, the content of each at least one selected from Cr, Mo, V, Ni, Cu, and Nb needs to be 0.005% or more. However, when the content of each of Cr, Mo, V, Ni, Cu, and Nb is more than 2.0%, this effect is saturated. Thus, the content of each of Cr, Mo, V, Ni, Cu, and Nb is set to 0.005% to 2.0%. Since Nb excessively increases the rolling load, Nb is preferably set to 0.005% to 0.050% and more preferably 0.005% to 0.030%.

At least one selected from 0.001% to 0.005% Ca and 0.001% to 0.005% of REM

Ca and REMs are elements effective in improving the formability by controlling the morphology of sulfides. In order to obtain such an effect, the content of each at least one selected from Ca and a REM needs to be 0.001% or more. However, when the content of each of Ca and the REM is more than 0.005% or more, the cleanliness of steel is adversely affected and properties are deteriorated in some cases. Thus, the content of each of Ca and the REM is set to 0.001% to 0.005%.

(2) Microstructure of Steel Sheet

Area fraction of martensite: 80% to 100% When the area fraction of martensite is less than 80%, it is difficult to achieve both a high strength of TS 1,300 MPa or more and high stretch-flange formability. Thus, the area fraction of martensite is set to 80% to 100% and is preferably 85% to 100%. In accordance with aspects of the present invention, the term "martensite" refers to one or both of auto-tempered martensite and tempered martensite and also refers to carbide-containing martensite. As a larger amount of tempered martensite is contained, the stretch-flange formability is more enhanced.

Area fraction of polygonal ferrite: 5% or less (including 0%)

When polygonal ferrite is more than 5%, the deterioration of stretch-flange formability is significant. Thus, the area fraction of polygonal ferrite is set to 0% to 5%.

Area fraction of retained austenite: less than 3% (including 0%)

In a stretch flange end surface, retained austenite transforms into martensite not containing hard carbide to deteriorate stretch-flange formability. Thus, the area fraction of retained austenite is set to less than 3%. The area fraction of retained austenite is preferably 2% or less and more preferably 1% or less.

Average hardness of martensite: 400 to 500 in terms of Vickers hardness (Hv)

A TS of 1,300 MPa or more can be achieved in such a manner that the area fraction of martensite is set to 80% to 100% and the average hardness of martensite is set to 400 or more in terms of Vickers hardness (Hv). However, when the average hardness of martensite is more than 500 in terms of Vickers hardness (Hv), the stretch-flange formability and the bendability are significantly deteriorated. Thus, the average hardness of martensite is set to 400 to 500 in terms of Vickers hardness (Hv).

Average grain size of martensite: 20 μm or less

When the average grain size of martensite is more than 20 μm, the deterioration of stretch-flange formability is significant. Thus, the average grain size of martensite is set to 20 μm or less and is preferably 15 μm or less.

Standard deviation of grain size of martensite: 7.0 μm or less

In accordance with aspects of the present invention, the variation in grain size of martensite, which is a primary phase, affects in-plane stability of stretch-flange formability and therefore is an important factor in accordance with aspects of the present invention. When the standard deviation of the grain size of martensite is more than 7.0 μm, variations in in-plane quality are significant. Thus, the standard deviation of the grain size of martensite is set to 7.0 μm or less. The standard deviation of the grain size of martensite is preferably 6.0 μm or less and more preferably 5.0 μm or less. Incidentally, the standard deviation σ is calculated by Equation (1) below.

[Math. 1]

$$\sigma = \sqrt{\frac{\Sigma(x - \bar{x})^2}{n - 1}} \quad (1)$$

where n is the number of grains of intended martensite, x is the size of each of the intended martensite grains, and $\bar{x}$ is the average size of the intended martensite grains.

Although a phase such as bainitic ferrite, pearlite, or fresh martensite is contained in addition to martensite, polygonal ferrite, and retained austenite in some cases, bainitic ferrite, pearlite, and fresh martensite are not preferable for stretch-flange formability. Therefore, the sum of the area fractions of bainitic ferrite, pearlite, and fresh martensite is set to less than 20% and is preferably set to less than 10%.

As used herein, the term "area fraction of each of martensite and polygonal ferrite" refers to the percentage of the area of each phase in an observed area. The area fraction of each of martensite and polygonal ferrite was determined in such a manner that samples were cut out of a lateral central portion, one-fourth portion, three-fourths portion, and both end portions of an annealed coil; a through-thickness cross section was polished and was then etched with 3% nital; a through-thickness one-fourth position was photographed with a SEM (scanning electron microscope) in three fields of view at ×1,500 magnification; and the area fraction of each phase was determined from obtained image data using Image-Pro developed by Media Cybernetics Inc. The average area fraction of the fields of view was defined as the area fraction of each phase. In the image data, polygonal ferrite can be identified as a black portion and martensite can be identified as a white portion containing carbides, thereby distinguished from each other. For the image data used to determine the area fraction, the average area was determined by dividing the sum of the areas of martensite in the fields of view by the number of martensite and the one-half power of the average area was defined as the average grain size of martensite. The standard deviation of the grain size of martensite was as follows: the area was determined for each martensite grain from the image data, the one-half power thereof was defined as the size of the grain, and the standard deviation was determined for the size of every obtained martensite grain and was defined as the standard deviation of the grain size of martensite. The area fraction of retained austenite was as follows: a steel sheet was ground to a through-thickness one-fourth position, and then polished by 0.1 mm by chemical polishing; the polished surface was measured for the integrated reflection intensity of the (200) plane, (220) plane, and (311) plane of fcc iron (austenite) and the (200) plane, (211) plane, and (220) plane of bcc iron (ferrite) with an X-ray diffractometer using Mo KU radiation; and the volume fraction was determined from the ratio of the integrated reflection intensity of each plane of fcc iron (austenite) to the integrated reflection intensity of each plane of bcc iron (ferrite) and was converted into the area fraction of retained austenite.

(3) Manufacturing Conditions

A high-strength galvanized steel sheet according to aspects of the present invention can be manufactured by, for example, a method including a hot-rolling step in which a slab having the above composition is hot-rolled at a slab-reheating temperature or slab-furnace charging temperature of 1,100° C. or higher and a finish rolling temperature of 800° C. or higher, is cooled after the completion of finish rolling such that the residence time in a temperature range of 600° C. to 700° C. is 10 seconds or less in total, and is coiled at an average coiling temperature of 400° C. to lower than 600° C. such that the difference between an average value of coiling temperature in a 100 mm-wide region at a widthwise central position of a coil and an average value of a coiling temperature in a 100 mm-wide region at a lateral edge position of the coil is 70° C. or lower; a cold-rolling step of cold-rolling a hot-rolled sheet obtained in the hot-rolling step with a cumulative rolling reduction of more than 20%; an annealing step in which a cold-rolled sheet obtained in the cold-rolling step is heated to 700° C. or lower at an average heating rate of 5° C./s or more, is further heated to an annealing temperature at an average heating rate of 1° C./s or less, and is held at an annealing temperature of 780° C. to 1,000° C. for 30 seconds to 1,000 seconds; a cooling step of cooling the cold-rolled sheet at an average cooling rate of 3° C./s or more after the annealing step; a galvanizing step of galvanizing the cold-rolled sheet after the cooling step; a galvannealing step of performing a galvannealing treatment by holding in a temperature range of 460° C. to 580° C. for 1 second to 40 second; a post-plating cooling step of performing cooling such that the residence time in a temperature range of (Ms temperature—50° C.) to the Ms temperature is 2 seconds or more; and a tempering step of performing a tempering treatment at a temperature of 350° C. or lower. The method is described below in detail.

A slab-reheating temperature or slab-furnace charging temperature of 1,100° C. or higher When the slab-reheating temperature or slab-furnace charging temperature is lower than 1,100° C., carbides remain without complete dissolving and the microstructure of the steel sheet according to aspects of the present invention is not obtained. Thus, the slab-reheating temperature or slab-furnace charging temperature is set to 1,100° C. or higher. In order to prevent the increase of scale loss, the slab-reheating temperature or slab-furnace charging temperature is preferably 1,300° C. or lower.

A finish rolling temperature of 800° C. or higher

When the finish rolling temperature is lower than 800° C., ferrite and the like are produced to cause two-phase rolling, a heterogeneous microstructure is formed, and the microstructure of the steel sheet according to aspects of the present invention is not obtained. Thus, the finish rolling temperature is set to 800° C. or higher. The upper limit temperature is not particularly limited but is preferably 950° C. or lower from the viewpoint of grain homogenization.

The residence time in a temperature range of 600° C. to 700° C. being 10 seconds or less in total When the residence time in a temperature range of 600° C. to 700° C. is more than 10 seconds after finish rolling, B-containing compounds such as B carbides are produced, solid-solute B in steel decreases, bainite and ferrite are present together in the hot-rolled sheet to cause microstructure heterogenization after annealing, an effect of B during annealing attenuates, and the microstructure of the steel sheet according to aspects of the present invention is not obtained. Thus, the residence time in a temperature range of 600° C. to 700° C. is set to 10 seconds or less in total and is preferably 8 seconds or less.

Coiling at an average coiling temperature of 400° C. to lower than 600° C.

When the average coiling temperature is 600° C. or higher, B-containing compounds such as B carbides are produced, solid-solute B in steel decreases, bainite and ferrite are present together in the hot-rolled sheet to cause microstructure heterogenization after annealing, an effect of B during annealing attenuates, and the microstructure of the steel sheet according to aspects of the present invention is not obtained. However, when the average coiling temperature is lower than 400° C., the shape of a sheet is impaired. Thus, the average coiling temperature is set to 400° C. to lower than 600° C. In accordance with aspects of the present invention, the term "average coiling temperature" refers to the average coiling temperature of a lateral central portion of a coil over the whole longitudinal length thereof.

The difference between an average value of coiling temperature in a 100 mm-wide region at a widthwise central position of a coil and an average value of the coiling temperature in a 100 mm-wide region at a lateral edge position of the coil is 70° C. or lower Generally, end portions of the coil are likely to be cooled and are lower in temperature than a lateral central portion. In accordance with aspects of the present invention, when an average value of the coiling temperature in a 100 mm-wide region at a lateral edge position of a coil is lower than that of the average value of coiling temperature in a 100 mm-wide region at a widthwise central position of the coil by more than 70° C. at the point in time of coiling, the increase of martensite contained in the microstructure of the hot-rolled sheet near an end portion is significant, variations in grain size of martensite after annealing are large, and the microstructure of the steel sheet according to aspects of the present invention is not obtained. Thus, the difference between an average value of coiling temperature in a 100 mm-wide region at a widthwise central position of a coil and an average value of the coiling temperature in a 100 mm-wide region at a lateral edge position of the coil is 70° C. or lower is set to 70° C. or less and is preferably 50° C. or less. A method for temperature uniformity is not particularly limited and temperature uniformity can be achieved, for example, by masking both ends of the coil upon cooling. As used herein, the term "average coiling temperature" refers to the average coiling temperature of the coil over the whole longitudinal length thereof and the term "100 mm-wide region at a widthwise central position" refers to a region ±50 mm extending from the lateral central position. The average coiling temperature of the average value of the coiling temperature in a 100 mm-wide region at a lateral edge position is set to the lower one of both 100 mm end regions.

Cold-rolling with a cumulative rolling reduction of more than 20%

When the cumulative rolling reduction is 20% or less, the difference in strain between a surface layer and an inner portion is likely to be caused during annealing, the unevenness in grain size of martensite is caused, and therefore the microstructure of the steel sheet according to aspects of the present invention is not obtained. Thus, the cumulative rolling reduction in cold rolling is set to more than 20% and is preferably 30% or more. The upper limit thereof is not particularly limited and is preferably 90% or lower from the viewpoint of the stability of a sheet shape.

Heating to 700° C. or lower at an average heating rate of 5° C./s or more

When the average heating rate (first average heating rate) to a first heating attained temperature of 700° C. or lower is less than 5° C./s, carbides become coarse and remain without complete dissolving after annealing and the reduction in hardness of martensite and the excessive production of ferrite and bainite are caused. Thus, the average heating rate is set to 5° C./s or more. The upper limit thereof is not particularly limited but is preferably 50° C./s or less from the viewpoint of production stability. When the first heating attained temperature is higher than 700° C. in the case of heating at an average heating rate of 5° C./s or more, the production of austenite occurs rapidly and heterogeneously and the microstructure of the steel sheet according to aspects of the present invention is not obtained. Thus, the first heating attained temperature is set to 700° C. or lower in the case of heating at an average heating rate of 5° C./s or more. The lower limit thereof is not particularly limited but is preferably 550° C. or more because when the lower limit thereof is lower than 550° C., productivity is impaired. As used herein, the term "average heating rate" refers to the value obtained by dividing the difference between the heating start temperature and the heating stop temperature by the time taken for heating.

Heating to an annealing temperature at an average heating rate of 1° C./s or less When the average heating rate (second average heating rate) to an annealing temperature of 780° C. to 1,000° C. is more than 1° C./s, the size of austenite grains is uneven and the microstructure of the steel sheet according to aspects of the present invention is not obtained. Thus, the average heating rate to 780° C. to 1,000° C. is set to 1° C./s or less. As used herein, the term "average heating rate" refers to the value obtained by dividing the difference between the first heating attained temperature and the annealing temperature by the time taken for heating.

Holding at an annealing temperature of 780° C. to 1,000° C. for 30 seconds to 1,000 seconds When the annealing temperature is lower than 780° C., the production of austenite is insufficient, ferrite and bainite are excessively produced, and the microstructure of the steel sheet according to aspects of the present invention is not obtained. However, when the annealing temperature is higher than 1,000° C., austenite grains become coarse and the microstructure of the steel sheet according to aspects of the present invention is not obtained. Thus, the annealing temperature is set to 780° C. to 1,000° C. The lower limit of the annealing temperature is preferably set to 790° C. or higher and more preferably 800° C. or higher. On the other hand, the upper limit of the annealing temperature is preferably set to 920° C. or lower. When the holding time at 780° C. to 1,000° C. is less than 30 seconds, the production of austenite is insufficient and the microstructure of the steel sheet according to aspects of the present invention is not obtained. However, when the holding time is more than 1,000 seconds, the austenite grains become coarse and the microstructure of the steel sheet according to aspects of the present invention is not obtained. Thus, the holding time at 780° C. to 1,000° C. is set to 30 seconds to 1,000 seconds and is preferably 30 seconds to 500 seconds.

An average cooling rate of 3° C./s or more

When the average cooling rate is less than 3° C./s, ferrite and bainite are excessively produced during cooling or holding and the microstructure of the steel sheet according to aspects of the present invention is not obtained. Thus, the average cooling rate is set to 3° C./s or more and is preferably 5° C./s or more. On the other hand, from the viewpoint of the shape stability of the steel sheet, the average cooling rate is preferably 100° C./s or less. As used herein, the term "average cooling rate" refers to the value obtained by dividing the difference between the annealing temperature and the cooling stop temperature by the time taken for cooling and the term "cooling stop temperature" refers to the temperature of the steel sheet entering a plating bath.

Plating Treatment

The plating treatment is preferably performed in such a manner that the steel sheet obtained as described above is immersed in a galvanizing bath having a temperature of 440° C. to 500° C. and the coating weight is then adjusted by gas wiping or the like. Furthermore, in the case of alloying a zinc coating, holding in a temperature range of 460° C. to 580° C. for 1 second to 40 seconds is preferable. The zinc coating is preferably formed using a galvanizing bath with an Al content of 0.08% to 0.25%.

After the steel sheet is subjected to the post-plating cooling step below, the steel sheet may be temper-rolled for the purpose of shape correction or the adjustment of surface roughness. Furthermore, various coating treatments may be performed using such as resin or fat coatings.

Cooling such that the residence time in a temperature range of (Ms temperature—50° C.) to the Ms temperature is 2 seconds or more When the residence time in a temperature range of (Ms temperature—50° C.) to the Ms temperature is less than 2 seconds, the auto-tempering of martensite is insufficient and the stretch-flange formability is deteriorated. Thus, the residence time in a temperature range of (Ms temperature—50° C.) to the Ms temperature is set to 2 seconds or more and is preferably 5 seconds or more. On the other hand, the residence time is preferably 50 seconds or less from the viewpoint of suppressing the reduction of λ due to the coarsening of carbides. As used herein, the term "Ms temperature" refers to the temperature at which martensite transformation starts and the term "auto-tempering" refers to a phenomenon where produced martensite is tempered during cooling. In accordance with aspects of the present invention, the Ms temperature is determined by measuring the expansion of a sample during cooling.

A tempering treatment at a temperature of 350° C. or lower (preferable condition)

In accordance with aspects of the present invention, the plated steel sheet is reheated after cooling, whereby the stretch-flange formability can be further enhanced. When the tempering temperature is higher than 350° C., coating quality is significantly deteriorated in some cases. Therefore, the tempering temperature is preferably 350° C. or lower. The tempering treatment may be performed by a method using a continuous annealing furnace, a box annealing furnace, or the like. When the steel sheet has portions in contact with each other as the steel sheet is tempered in the form of a coil, the tempering time is preferably set to 24 h or less from the viewpoint of the suppression of adhesion or the like.

Other manufacturing conditions are not particularly limited. Conditions below are preferable.

In order to prevent macro-segregation, the slab is preferably manufactured by a continuous casting process. The slab may be manufactured by an ingot-casting process or a thin slab-casting process. The slab may be hot-rolled in such a manner that the slab is cooled to room temperature, then reheated, and hot-rolled or in such a manner that the slab is charged into a furnace without cooling to room temperature and hot-rolled. Alternatively, the slab may be subjected to the following process: an energy-saving process in which slight heat retaining of the slab is performed and is immediately followed by hot rolling.

When the slab is hot-rolled, a rough bar after rough rolling may be heated from the viewpoint that a trouble during rolling is prevented even if the heating temperature of the slab is low. Also the following process can be used: a so-called continuous rolling process in which rough bars are bonded to each other and are continuously finish-rolled. For the purpose of reducing the rolling load or homogenizing a shape or quality, in all or some passes of finish rolling, lubrication rolling is preferably performed such that the coefficient of friction is 0.10 to 0.25.

The coiled steel sheet is descaled by pickling or the like, and then cold-rolled, annealed, and galvanized under the above conditions.

Example 1

Steels having a composition shown in Table 1 were produced in a melting furnace and were then cast into steel slabs by a continuous casting process. The steel slabs were heated, roughly rolled, finish-rolled, cooled, and then coiled under conditions shown in Table 2, whereby hot-rolled sheets were obtained. Next, the hot-rolled sheets were cold-rolled to a thickness of 1.4 mm, whereby cold-rolled sheets were manufactured. The cold-rolled steel sheets were annealed. Annealing was performed in a continuous galvanizing line under conditions shown in Table 2. Next, a plating treatment was performed (some were further subjected to an alloying treatment) and cooling was performed (some were further subjected to a tempering treatment), whereby galvanized steel sheets and galvannealed steel sheets 1 to 29 were manufactured. The galvanized steel sheets were manufactured by immersion in a 460° C. plating bath and by forming coatings with a coating weight of 35 g/m$^2$ to 45 g/m$^2$. The galvannealed steel sheets were manufactured by performing the alloying treatment at 460° C. to 580° C. after the formation of the coatings. The obtained plated steel sheets were subjected to skin-pass rolling with a reduction of 0.2% and were then determined for tensile properties, stretch-flange formability, in-plane stability of stretch-flange formability, bendability, and hardness in accordance with test methods below. The rolling load was evaluated by the product of the linear load for hot rolling and the linear load for cold rolling, and the product less than 4,000,000 k gf$^2$/mm$^2$ was rated good, that less than 3,000,000 k gf$^2$/mm$^2$ being preferable.

(Tensile Test)

A JIS No. 5 tensile specimen (JIS Z 2201) was taken from a lateral central portion of each annealed coil in a direction perpendicular to a rolling direction and was subjected to a tensile test at a strain rate of $10^{-3}$ s$^{-1}$ in accordance with JIS Z 2241, whereby the TS was determined.

(Hole Expanding Test)

Three specimens with a size of 150 mm×150 mm were taken from a lateral central portion of each annealed coil and were subjected to a hole expanding test in accordance with JFST 1001 (the Japan Iron and Steel Federation standards) three times, whereby the average hole expansion ratio λ (%) thereof was determined and the stretch-flange formability thereof was evaluated. The case where λ was 15% or more and TS×λ was 25,000 MPa·% or more was rated good in stretch-flange formability.

For the in-plane stability of stretch-flange formability, three specimens with a size of 150 mm×150 mm were taken from each of both end portions, a one-fourth portion, a three-fourths portion, and a central portion of the annealed coil in the lateral direction and were subjected to the hole expanding test same as the above. The standard deviation of X (%) of the 15 specimens obtained was calculated. One in which this value was less than 4 was rated good in in-plane stability of stretch-flange formability.

(Hardness Test)

A 10 mm wide, 15 mm long specimen with a cross section parallel to the rolling direction was taken and the Vickers hardness (Hv) of martensite was measured at a position 200 μm apart from a surface thereof. Five points were measured with a load of 0.98 N (0.1 kgf) and the average of three measurements excluding the maximum and the minimum was defined as the Vickers hardness (Hv).

(Bending Test)

A 35 mm wide, 100 mm long rectangular specimen having a bending axis along the rolling direction was taken from each of both end portions, a one-fourth portion, a three-fourths portion, and a central portion of the coil in the lateral direction and was subjected to a bending test. A 90° V-bending test was performed at a stroke speed of 10 mm/s, an indentation load of 10 ton, and a bend radius R of 3.0 mm for a press-holding time of 5 seconds. A ridge portion of the bend top was observed with a magnifier with 10× magnification. One with a crack, observed even in one lateral position, having a length of 0.5 mm or more was rated poor and one with a crack having a length of less than 0.5 mm was rated excellent.

(Coating Quality)

Coating quality was evaluated on a five-point scale below by visually observing surface of each steel sheet. A rating of 3 or more is acceptable, a rating of 4 or more is preferable, and a rating of 5 is more preferable.

1: A large number of unplated spots are present.
2: Some unplated spots are present.
3: No unplated spot is present and a large number of clear scale patterns are present.
4: No unplated spot is present and a slight number of scale patterns are present.
5: No unplated spot or scale pattern is present.

TABLE 1

| Steel | Composition (mass percent) | | | | | | | | | | Ti/N | Remarks |
|---|---|---|---|---|---|---|---|---|---|---|---|---|
| | C | Si | Mn | P | S | Al | N | Ti | B | Others | | |
| A | 0.15 | 0.02 | 2.9 | 0.015 | 0.002 | 0.035 | 0.003 | 0.019 | 0.0020 | — | 6.3 | Within the scope of the present invention |
| B | 0.17 | 0.11 | 2.6 | 0.008 | 0.002 | 0.031 | 0.004 | 0.020 | 0.0012 | — | 5.0 | Within the scope of the present invention |
| C | 0.22 | 0.04 | 2.5 | 0.005 | 0.001 | 0.019 | 0.002 | 0.015 | 0.0013 | — | 7.5 | Within the scope of the present invention |
| D | 0.16 | 0.03 | 1.8 | 0.022 | 0.003 | 0.022 | 0.003 | 0.018 | 0.0010 | Cr: 1.1 | 6.0 | Within the scope of the present invention |
| E | 0.14 | 0.02 | 1.9 | 0.012 | 0.001 | 0.034 | 0.001 | 0.022 | 0.0011 | Mo: 0.4 | 22.0 | Within the scope of the present invention |
| F | 0.18 | 0.01 | 2.8 | 0.023 | 0.005 | 0.033 | 0.003 | 0.020 | 0.0018 | Nb: 0.01 | 6.7 | Within the scope of the present invention |
| G | 0.15 | 0.02 | 3.1 | 0.012 | 0.002 | 0.038 | 0.003 | 0.015 | 0.0006 | V: 0.05 | 5.0 | Within the scope of the present invention |
| H | 0.14 | 0.51 | 2.8 | 0.028 | 0.003 | 0.033 | 0.003 | 0.018 | 0.0009 | Ni: 0.1 | 6.0 | Within the scope of the present invention |
| I | 0.21 | 0.01 | 2.6 | 0.011 | 0.003 | 0.045 | 0.004 | 0.019 | 0.0010 | Cu: 0.2 | 4.8 | Within the scope of the present invention |
| J | 0.14 | 0.63 | 2.7 | 0.009 | 0.003 | 0.012 | 0.005 | 0.021 | 0.0010 | Ca: 0.001 | 4.2 | Within the scope of the present invention |
| K | 0.13 | 0.80 | 2.8 | 0.015 | 0.001 | 0.025 | 0.001 | 0.010 | 0.0011 | REM: 0.002 | 10.0 | Within the scope of the present invention |
| L | 0.11 | 0.02 | 3.2 | 0.013 | 0.003 | 0.028 | 0.002 | 0.021 | 0.0013 | — | 10.5 | Out of the scope of the present invention |
| M | 0.27 | 0.02 | 2.3 | 0.015 | 0.002 | 0.029 | 0.003 | 0.020 | 0.0008 | — | 6.7 | Out of the scope of the present invention |
| N | 0.13 | 1.20 | 2.7 | 0.013 | 0.001 | 0.041 | 0.003 | 0.016 | 0.0014 | — | 5.3 | Out of the scope of the present invention |
| O | 0.18 | 0.01 | 1.2 | 0.007 | 0.002 | 0.008 | 0.004 | 0.018 | 0.0016 | — | 4.5 | Out of the scope of the present invention |
| P | 0.19 | 0.03 | 2.5 | 0.018 | 0.004 | 0.037 | 0.004 | 0.001 | 0.0015 | — | 0.3 | Out of the scope of the present invention |
| Q | 0.15 | 0.02 | 2.6 | 0.011 | 0.001 | 0.036 | 0.002 | 0.019 | 0.0002 | — | 9.5 | Out of the scope of the present invention |

TABLE 2

| Steel sheet No. | Steel | Hot-rolling conditions | | | | | Cold-rolling conditions Cumulative cold-rolling reduction (%) | Annealing conditions | | | | |
|---|---|---|---|---|---|---|---|---|---|---|---|---|
| | | Slab-heating temperature or slab-furnace charging temperature (° C.) | Finish rolling temperature (° C.) | Residence time in temperature range of 600° C. to 700° C. (s) | Average coiling temperature (° C.) | Difference in coiling temperature between center and edge portion of coil*1 (° C.) | | First average heating rate*2 (° C./s) | First heating attained temperature*3 (° C.) | Second average heating temperature*4 (° C./s) | Annealing temperature (° C.) |
| 1 | A | 1200 | 890 | 2 | 560 | 40 | 50 | 8 | 650 | 0.5 | 825 |
| 2 | | 1200 | 890 | 12 | 560 | 45 | 50 | 8 | 650 | 0.5 | 825 |
| 3 | | 1200 | 890 | 13 | 650 | 38 | 50 | 10 | 650 | 0.5 | 825 |
| 4 | | 1200 | 890 | 2 | 550 | 94 | 50 | 10 | 650 | 0.5 | 825 |
| 5 | B | 1200 | 870 | 2 | 550 | 25 | 56 | 10 | 680 | 0.3 | 850 |
| 6 | | 1200 | 870 | 2 | 550 | 29 | 20 | 10 | 680 | 0.3 | 850 |
| 7 | | 1200 | 870 | 1 | 500 | 25 | 56 | 0.5 | 680 | 0.3 | 850 |
| 8 | | 1200 | 870 | 1 | 500 | 25 | 56 | 10 | 750 | 0.3 | 850 |
| 9 | C | 1200 | 900 | 2 | 550 | 31 | 60 | 10 | 600 | 0.3 | 825 |
| 10 | | 1200 | 900 | 2 | 550 | 31 | 60 | 8 | 600 | 10 | 825 |
| 11 | | 1200 | 900 | 2 | 550 | 31 | 60 | 8 | 600 | 0.8 | 770 |
| 12 | D | 1200 | 850 | 2 | 450 | 39 | 43 | 6 | 580 | 0.2 | 830 |
| 13 | | 1200 | 850 | 2 | 450 | 39 | 43 | 30 | 580 | 0.8 | 830 |
| 14 | E | 1200 | 880 | 2 | 550 | 18 | 43 | 7 | 650 | 0.5 | 840 |
| 15 | | 1200 | 880 | 2 | 550 | 18 | 43 | 7 | 650 | 0.6 | 840 |
| 16 | F | 1200 | 880 | 1 | 500 | 60 | 64 | 9 | 650 | 0.5 | 790 |

TABLE 2-continued

| | | | | | | | | | | | |
|---|---|---|---|---|---|---|---|---|---|---|---|
| 17 | | 1200 | 880 | 1 | 500 | 60 | 64 | 9 | 650 | 0.6 | 790 |
| 18 | G | 1200 | 880 | 5 | 500 | 43 | 64 | 6 | 650 | 0.5 | 860 |
| 19 | | 1200 | 880 | 5 | 500 | 43 | 64 | 6 | 650 | 0.6 | 1050 |
| 20 | H | 1200 | 880 | 3 | 500 | 64 | 38 | 10 | 650 | 0.5 | 850 |
| 21 | I | 1200 | 880 | 3 | 500 | 55 | 38 | 10 | 650 | 0.5 | 850 |
| 22 | J | 1200 | 880 | 3 | 500 | 56 | 50 | 10 | 650 | 0.5 | 850 |
| 23 | K | 1200 | 880 | 3 | 500 | 34 | 50 | 10 | 650 | 0.5 | 850 |
| 24 | L | 1200 | 880 | 3 | 500 | 49 | 50 | 10 | 650 | 0.5 | 850 |
| 25 | M | 1200 | 880 | 3 | 500 | 33 | 50 | 10 | 650 | 0.5 | 850 |
| 26 | N | 1200 | 880 | 3 | 500 | 50 | 31 | 10 | 650 | 0.5 | 900 |
| 27 | O | 1200 | 880 | 3 | 500 | 29 | 50 | 10 | 650 | 0.5 | 850 |
| 28 | P | 1200 | 880 | 3 | 500 | 18 | 50 | 10 | 650 | 0.5 | 850 |
| 29 | Q | 1200 | 880 | 3 | 500 | 58 | 50 | 10 | 650 | 0.5 | 850 |

| | Annealing conditions | | | Plating | | | Plating conditions | | | | |
|---|---|---|---|---|---|---|---|---|---|---|---|
| Steel sheet No. | Annealing holding time (s) | Average cooling rate (° C./s) | * Cooling residence time*[5] (s) | Plating bath temperature (° C.) | Alloying temperature (° C.) | Alloying holding time (s) | Ms temperature (° C.) | Residence time between temperature 50° C. lower than Ms temperature and Ms temperature (s) | Tempering temperature (° C.) | Coating state*[6] | Remarks |
| 1 | 500 | 6 | 5 | 465 | 510 | 20 | 359 | 5 | — | GA | Inventive example |
| 2 | 500 | 6 | 5 | 465 | 510 | 20 | 358 | 5 | — | GA | Comparative example |
| 3 | 500 | 6 | 5 | 465 | 510 | 20 | 355 | 5 | — | GA | Comparative example |
| 4 | 500 | 6 | 5 | 465 | 510 | 20 | 359 | 5 | — | GA | Comparative example |
| 5 | 200 | 15 | 3 | 465 | — | — | 361 | 3 | 150 | GI | Inventive example |
| 6 | 200 | 15 | 3 | 465 | — | — | 361 | 3 | 150 | GI | Comparative example |
| 7 | 200 | 15 | 3 | 465 | — | — | 347 | 3 | 150 | GI | Comparative example |
| 8 | 200 | 15 | 3 | 465 | — | — | 361 | 3 | 150 | GI | Comparative example |
| 9 | 300 | 5 | 10 | 465 | 490 | 35 | 350 | 10 | 200 | GA | Inventive example |
| 10 | 300 | 5 | 10 | 465 | 490 | 35 | 350 | 10 | 200 | GA | Comparative example |
| 11 | 300 | 5 | 10 | 465 | 490 | 35 | 339 | 10 | 200 | GA | Comparative example |
| 12 | 120 | 6 | 2 | 465 | — | — | 361 | 2 | — | GI | Inventive example |
| 13 | 20 | 30 | 2 | 465 | — | — | 353 | 2 | — | GI | Comparative example |
| 14 | 300 | 30 | 5 | 465 | 510 | 20 | 390 | 5 | 200 | GA | Inventive example |
| 15 | 300 | 1 | 5 | 465 | 510 | 20 | 384 | 5 | 200 | GA | Comparative example |
| 16 | 180 | 5 | 5 | 465 | 510 | 20 | 350 | 5 | — | GA | Inventive example |
| 17 | 180 | 5 | 0.1 | 465 | 510 | 20 | 350 | 0.1 | — | GA | Comparative example |
| 18 | 100 | 5 | 5 | 465 | 510 | 20 | 352 | 5 | 150 | GA | Inventive example |
| 19 | 100 | 5 | 5 | 465 | 510 | 20 | 352 | 5 | 150 | GA | Comparative example |
| 20 | 300 | 10 | 5 | 465 | 510 | 20 | 358 | 5 | — | GA | Inventive example |
| 21 | 300 | 10 | 5 | 465 | 510 | 20 | 350 | 5 | — | GA | Inventive example |
| 22 | 300 | 10 | 5 | 465 | 530 | 20 | 362 | 5 | — | GA | Inventive example |
| 23 | 300 | 10 | 5 | 465 | 540 | 20 | 360 | 5 | 300 | GA | Inventive example |
| 24 | 300 | 10 | 5 | 465 | 510 | 20 | 362 | 5 | — | GA | Comparative example |
| 25 | 300 | 10 | 5 | 465 | 510 | 20 | 341 | 5 | — | GA | Comparative example |
| 26 | 300 | 10 | 5 | 465 | 560 | 30 | 359 | 5 | — | GA | Comparative example |
| 27 | 300 | 10 | 5 | 465 | 510 | 20 | 361 | 5 | — | GA | Comparative example |
| 28 | 300 | 10 | 5 | 465 | 510 | 20 | 347 | 5 | — | GA | Comparative example |
| 29 | 300 | 10 | 5 | 465 | 510 | 20 | 345 | 5 | — | GA | Comparative example |

*[1]Difference in coiling temperature between center and end portion of coil: the difference in average temperature between a 100 mm long lateral central position and 100 mm long end portion of a hot-rolled coil just before coiling.
*[2]First average heating rate: the value obtained by dividing the difference between the heating start temperature and the first heating attained temperature by the time taken for heating.
*[3]First heating attained temperature: the temperature attained by first heating.
*[4]Second average heating temperature: the value obtained by dividing the difference between the first heating attained temperature and the annealing temperature by the time taken for heating.
*[5]Cooling residence time: the residence time in the temperature range of a temperature 50° C. lower than the Ms temperature and the Ms temperature during cooling after plating or galvannealing.
*[6]Coating state: GI is a galvanized steel sheet and GA is a galvannealed steel sheet.

TABLE 3

| Steel sheet No. | Microstructure of steel sheet | | | | | | Mechanical properties | | | | |
|---|---|---|---|---|---|---|---|---|---|---|---|
| | V(PF)*[1] (%) | V(M)*[1] (%) | V(γ)*[1] (%) | Others*[1] (%) | d(M)*[2] (μm) | σ(dM)*[3] (μm) | Hardness of martensite Hv | TS (MPa) | λ (%) | σ(λ)*[4] (%) | TS × λ (MPa · %) |
| 1 | 0 | 94 | 0 | 6 | 9 | 3.9 | 425 | 1374 | 38 | 2 | 52212 |
| 2 | 0 | 91 | 1 | 8 | 10 | 7.3 | 418 | 1358 | 29 | 4 | 39382 |

TABLE 3-continued

| | | | | | | | | | | | |
|---|---|---|---|---|---|---|---|---|---|---|---|
| 3 | 1 | 85 | 1 | 13 | 11 | 8.1 | 430 | 1319 | 20 | 5 | 26380 |
| 4 | 0 | 95 | 0 | 5 | 8 | 10.1 | 425 | 1380 | 40 | 7 | 55200 |
| 5 | 0 | 98 | 0 | 2 | 12 | 2.7 | 430 | 1424 | 49 | 1 | 69776 |
| 6 | 0 | 97 | 0 | 3 | 13 | 9.2 | 433 | 1426 | 43 | 6 | 61318 |
| 7 | 7 | 72 | 1 | 20 | 13 | 3.3 | 456 | 1288 | 25 | 2 | 32200 |
| 8 | 0 | 99 | 0 | 1 | 11 | 8.4 | 435 | 1437 | 36 | 5 | 51732 |
| 9 | 0 | 100 | 0 | 0 | 8 | 2.2 | 484 | 1631 | 31 | 1 | 50561 |
| 10 | 0 | 100 | 0 | 0 | 6 | 7.8 | 483 | 1626 | 30 | 4 | 48780 |
| 11 | 5 | 76 | 1 | 18 | 4 | 3.5 | 541 | 1555 | 5 | 2 | 7775 |
| 12 | 0 | 97 | 0 | 3 | 10 | 3.7 | 450 | 1392 | 41 | 2 | 57072 |
| 13 | 12 | 86 | 1 | 1 | 3 | 4.6 | 473 | 1316 | 13 | 3 | 17108 |
| 14 | 0 | 100 | 0 | 0 | 3 | 2.5 | 413 | 1344 | 35 | 1 | 47040 |
| 15 | 6 | 86 | 2 | 6 | 2 | 3.2 | 426 | 1285 | 16 | 2 | 20560 |
| 16 | 3 | 97 | 0 | 0 | 6 | 4.9 | 444 | 1463 | 33 | 3 | 48279 |
| 17 | 3 | 4 | 0 | 93 | 6 | 5.2 | 480 | 1611 | 12 | 2 | 19332 |
| 18 | 0 | 100 | 0 | 0 | 12 | 3.9 | 420 | 1382 | 41 | 2 | 56662 |
| 19 | 0 | 100 | 0 | 0 | 29 | 7.7 | 420 | 1379 | 18 | 5 | 24822 |
| 20 | 0 | 99 | 0 | 1 | 12 | 4.9 | 419 | 1369 | 44 | 3 | 60236 |
| 21 | 0 | 100 | 0 | 0 | 13 | 4.3 | 476 | 1593 | 25 | 3 | 39825 |
| 22 | 0 | 95 | 0 | 5 | 12 | 4.3 | 414 | 1332 | 45 | 3 | 59940 |
| 23 | 0 | 100 | 0 | 0 | 11 | 3.2 | 403 | 1306 | 66 | 2 | 86196 |
| 24 | 0 | 99 | 0 | 1 | 13 | 3.8 | 397 | 1278 | 63 | 3 | 80514 |
| 25 | 0 | 100 | 0 | 0 | 12 | 2.9 | 538 | 1865 | 9 | 2 | 16785 |
| 26 | 0 | 97 | 1 | 2 | 18 | 4.0 | 418 | 1363 | 44 | 4 | 59972 |
| 27 | 2 | 42 | 1 | 55 | 13 | 2.6 | 511 | 1194 | 10 | 2 | 11940 |
| 28 | 1 | 68 | 1 | 30 | 12 | 2.1 | 489 | 1232 | 26 | 1 | 32032 |
| 29 | 4 | 59 | 2 | 35 | 12 | 4.1 | 494 | 1210 | 24 | 3 | 29040 |

| Steel sheet No. | Rolling load Linear load for hot rolling*5 × Linear load for cold rolling*6 × $10^6$ (kgf$^2$/mm$^2$) | Coating quality | Bendability | Remarks |
|---|---|---|---|---|
| 1 | 2.4 | 5 | Excellent | Inventive example |
| 2 | 2.2 | 5 | Poor | Comparative example |
| 3 | 2.2 | 5 | Poor | Comparative example |
| 4 | 2.4 | 5 | Poor | Comparative example |
| 5 | 2.5 | 5 | Excellent | Inventive example |
| 6 | 2.5 | 5 | Poor | Comparative example |
| 7 | 2.5 | 5 | Excellent | Comparative example |
| 8 | 2.5 | 5 | Poor | Comparative example |
| 9 | 2.6 | 5 | Excellent | Inventive example |
| 10 | 2.6 | 5 | Poor | Comparative example |
| 11 | 2.6 | 5 | Poor | Comparative example |
| 12 | 2.4 | 5 | Excellent | Inventive example |
| 13 | 2.4 | 5 | Excellent | Comparative example |
| 14 | 2.0 | 5 | Excellent | Inventive example |
| 15 | 2.0 | 5 | Excellent | Comparative example |
| 16 | 2.5 | 5 | Excellent | Inventive example |
| 17 | 2.5 | 5 | Poor | Comparative example |
| 18 | 2.5 | 5 | Excellent | Inventive example |
| 19 | 2.5 | 5 | Poor | Comparative example |
| 20 | 3.3 | 4 | Excellent | Inventive example |
| 21 | 2.5 | 5 | Excellent | Inventive example |
| 22 | 3.7 | 3 | Excellent | Inventive example |
| 23 | 3.9 | 3 | Excellent | Inventive example |
| 24 | 3.5 | 5 | Excellent | Comparative example |
| 25 | 2.6 | 5 | Poor | Comparative example |
| 26 | 4.4 | 2 | Poor | Comparative example |
| 27 | 1.5 | 5 | Poor | Comparative example |
| 28 | 2.7 | 5 | Excellent | Comparative example |
| 29 | 2.6 | 5 | Excellent | Comparative example |

*[1]V(PF), V(m), V(γ), and others: the area fraction of polygonal ferrite, the area fraction of martensite, the area fraction of retained austenite, and the area fraction of a phase or phases other than those aforementioned, respectively.
*[2]d(M): the average grain size of martensite.
*[3]σ(dM): the standard deviation of the grain size of martensite.
*[4]σ(λ): the standard deviation of λ.
*[5]Linear load for hot rolling: the value obtained by dividing the actual load applied when one pass was performed at 1,050° C. with a rolling reduction of 39% by the width of a sheet.
*[6]Linear load for cold rolling: the value obtained by dividing the actual load applied when one pass was performed with a rolling reduction of 25% by the width of a sheet.

All inventive examples are high-strength galvanized steel sheets in which the TS is 1,300 MPa or more, the λ is 15% or more, TS×λ is 25,000 MPa·% or more, and the standard deviation of λ is less than 4% and which have excellent stretch-flange formability, in-plane stability of stretch-flange formability, and bendability. However, comparative examples which are out of the scope of the present invention have no desired strength, no desired stretch-flange formability, no desired in-plane stability of stretch-flange formability, or no desired bendability.

The inventive examples achieved a rolling load of less than 4,000,000 kgf$^2$/mm$^2$ and good results from the viewpoint of the shape of a steel sheet. However, in Comparative Example 26, the rolling load was 4,000,000 kgf²/mm² or more, an edge wave and a center buckle were caused, and the shape of the steel sheet was poor.

The use of a high-strength galvanized steel sheet according to aspects of the present invention in automotive parts applications contributes to automotive weight reduction and is capable of significantly contributes to the increase in performance of automotive bodies.

The invention claimed is:

1. A high-strength galvanized steel sheet excellent in stretch-flange formability, in-plane stability of stretch-flange formability, and bendability;
    the high-strength galvanized steel sheet having a composition which contains 0.12% to 0.25% C, 0.01% to 1.00% Si, 1.5% to 4.0% Mn, 0.100% or less P, 0.02% or less S, 0.01% to 0.10% Al, 0.001% to 0.010% N, 0.005% to 0.100% Ti, and 0.0005% to 0.0050% B on a mass basis, the remainder being Fe and inevitable impurities, and which satisfies Ti>4N (where Ti and N represent the mass percent of each element);
    the high-strength galvanized steel sheet containing 80% to 100% martensite in terms of area fraction, 5% or less (including 0%) polygonal ferrite in terms of area fraction, and less than 3% (including 0%) retained austenite in terms of area fraction, wherein the average hardness of martensite is 400 to 500 in terms of Vickers hardness (Hv), the average grain size of martensite is 20 μm or less, and the standard deviation of the grain size of martensite is 7.0 μm or less.

2. The high-strength galvanized steel sheet, excellent in stretch-flange formability, in-plane stability of stretch-flange formability, and bendability, according to claim 1, the high-strength galvanized steel sheet containing at least one selected from 0.005% to 2.0% Cr, 0.005% to 2.0% Mo, 0.005% to 2.0% V, 0.005% to 2.0% Ni, 0.005% to 2.0% Cu, and 0.005% to 2.0% Nb on a mass basis.

3. The high-strength galvanized steel sheet, excellent in stretch-flange formability, in-plane stability of stretch-flange formability, and bendability, according to claim 1, the high-strength galvanized steel sheet containing at least one selected from 0.001% to 0.005% Ca and 0.001% to 0.005% of a REM on a mass basis.

4. A method for manufacturing a high-strength galvanized steel sheet which is excellent in stretch-flange formability, in-plane stability of stretch-flange formability, and bendability and which contains 80% to 100% martensite in terms of area fraction, 5% or less (including 0%) polygonal ferrite in terms of area fraction, and less than 3% (including 0%) retained austenite in terms of area fraction, the average hardness of martensite being 400 to 500 in terms of Vickers hardness (Hv), the average grain size of martensite being 20 μM or less, and the standard deviation of the grain size of martensite being 7.0 μm or less, the method comprising:
    a hot-rolling step in which a slab having the composition specified in claim 1 is hot-rolled at a slab-reheating temperature or slab-furnace charging temperature of 1,100° C. or higher and a finish rolling temperature of 800° C. or higher, is cooled after the completion of finish rolling such that the residence time in a temperature range of 600° C. to 700° C. is 10 seconds or less in total, and is coiled at an average coiling temperature of 400° C. to lower than 600° C. such that the difference between an average value of coiling temperature in a 100 mm-wide region at a widthwise central position of a coil and an average value of a coiling temperature in a 100 mm-wide region at a lateral edge position of the coil is 70° C. or lower;
    a cold-rolling step of cold-rolling a hot-rolled sheet obtained in the hot-rolling step with a cumulative rolling reduction of more than 20%;
    an annealing step in which a cold-rolled sheet obtained in the cold-rolling step is heated to 700° C. or lower at an average heating rate of 5° C./s or more, is further heated to an annealing temperature at an average heating rate of 1° C./s or less, and is held at an annealing temperature of 780° C. to 1,000° C. for 30 seconds to 1,000 seconds;
    a cooling step of cooling the cold-rolled sheet at an average cooling rate of 3° C./s or more after the annealing step;
    a galvanizing step of galvanizing the cold-rolled sheet after the cooling step; and
    a post-plating cooling step of cooling the galvanized sheet after the galvanizing step such that the residence time in a temperature range of (Ms temperature—50° C.) to the Ms temperature is 2 seconds or more.

5. The method, for manufacturing the high-strength galvanized steel sheet excellent in stretch-flange formability, in-plane stability of stretch-flange formability, and bendability, according to claim 4, the method comprising a galvannealing step of performing a galvannealing treatment by holding in a temperature range of 460° C. to 580° C. for 1 second to 40 second, the galvannealing step being after the galvanizing step and before the post-plating cooling step.

6. The method, for manufacturing the high-strength galvanized steel sheet excellent in stretch-flange formability, in-plane stability of stretch-flange formability, and bendability, according to claim 4, the method comprising a tempering step of performing a tempering treatment at a temperature of 350° C. or lower after the post-plating cooling step.

7. The high-strength galvanized steel sheet, excellent in stretch-flange formability, in-plane stability of stretch-flange formability, and bendability, according to claim 2, the high-strength galvanized steel sheet containing at least one selected from 0.001% to 0.005% Ca and 0.001% to 0.005% of a REM on a mass basis.

8. The method, for manufacturing the high-strength galvanized steel sheet excellent in stretch-flange formability, in-plane stability of stretch-flange formability, and bendability, according to claim 5, the method comprising a tempering step of performing a tempering treatment at a temperature of 350° C. or lower after the post-plating cooling step.

9. A method for manufacturing a high-strength galvanized steel sheet which is excellent in stretch-flange formability, in-plane stability of stretch-flange formability, and bendability and which contains 80% to 100% martensite in terms of area fraction, 5% or less (including 0%) polygonal ferrite in terms of area fraction, and less than 3% (including 0%) retained austenite in terms of area fraction, the average hardness of martensite being 400 to 500 in terms of Vickers hardness (Hv), the average grain size of martensite being 20 μm or less, and the standard deviation of the grain size of martensite being 7.0 μm or less, the method comprising:
    a hot-rolling step in which a slab having the composition specified in claim 2 is hot-rolled at a slab-reheating temperature or slab-furnace charging temperature of 1,100° C. or higher and a finish rolling temperature of 800° C. or higher, is cooled after the completion of finish rolling such that the residence time in a temperature range of 600° C. to 700° C. is 10 seconds or less in total, and is coiled at an average coiling temperature of 400° C. to lower than 600° C. such that the difference between an average value of coiling temperature in a 100 mm-wide region at a widthwise central position of a coil and an average value of a coiling temperature in a 100 mm-wide region at a lateral edge position of the coil is 70° C. or lower;

a cold-rolling step of cold-rolling a hot-rolled sheet obtained in the hot-rolling step with a cumulative rolling reduction of more than 20%;

an annealing step in which a cold-rolled sheet obtained in the cold-rolling step is heated to 700° C. or lower at an average heating rate of 5° C./s or more, is further heated to an annealing temperature at an average heating rate of 1° C./s or less, and is held at an annealing temperature of 780° C. to 1,000° C. for 30 seconds to 1,000 seconds;

a cooling step of cooling the cold-rolled sheet at an average cooling rate of 3° C./s or more after the annealing step;

a galvanizing step of galvanizing the cold-rolled sheet after the cooling step; and a post-plating cooling step of cooling the galvanized sheet after the galvanizing step such that the residence time in a temperature range of (Ms temperature—50° C.) to the Ms temperature is 2 seconds or more.

10. A method for manufacturing a high-strength galvanized steel sheet which is excellent in stretch-flange formability, in-plane stability of stretch-flange formability, and bendability and which contains 80% to 100% martensite in terms of area fraction, 5% or less (including 0%) polygonal ferrite in terms of area fraction, and less than 3% (including 0%) retained austenite in terms of area fraction, the average hardness of martensite being 400 to 500 in terms of Vickers hardness (Hv), the average grain size of martensite being 20 µm or less, and the standard deviation of the grain size of martensite being 7.0 µm or less, the method comprising:

a hot-rolling step in which a slab having the composition specified in claim 3 is hot-rolled at a slab-reheating temperature or slab-furnace charging temperature of 1,100° C. or higher and a finish rolling temperature of 800° C. or higher, is cooled after the completion of finish rolling such that the residence time in a temperature range of 600° C. to 700° C. is 10 seconds or less in total, and is coiled at an average coiling temperature of 400° C. to lower than 600° C. such that the difference between an average value of coiling temperature in a 100 mm-wide region at a widthwise central position of a coil and an average value of a coiling temperature in a 100 mm-wide region at a lateral edge position of the coil is 70° C. or lower;

a cold-rolling step of cold-rolling a hot-rolled sheet obtained in the hot-rolling step with a cumulative rolling reduction of more than 20%;

an annealing step in which a cold-rolled sheet obtained in the cold-rolling step is heated to 700° C. or lower at an average heating rate of 5° C./s or more, is further heated to an annealing temperature at an average heating rate of 1° C./s or less, and is held at an annealing temperature of 780° C. to 1,000° C. for 30 seconds to 1,000 seconds;

a cooling step of cooling the cold-rolled sheet at an average cooling rate of 3° C./s or more after the annealing step;

a galvanizing step of galvanizing the cold-rolled sheet after the cooling step; and a post-plating cooling step of cooling the galvanized sheet after the galvanizing step such that the residence time in a temperature range of (Ms temperature—50° C.) to the Ms temperature is 2 seconds or more.

11. A method for manufacturing a high-strength galvanized steel sheet which is excellent in stretch-flange formability, in-plane stability of stretch-flange formability, and bendability and which contains 80% to 100% martensite in terms of area fraction, 5% or less (including 0%) polygonal ferrite in terms of area fraction, and less than 3% (including 0%) retained austenite in terms of area fraction, the average hardness of martensite being 400 to 500 in terms of Vickers hardness (Hv), the average grain size of martensite being 20 µm or less, and the standard deviation of the grain size of martensite being 7.0 µm or less, the method comprising:

a hot-rolling step in which a slab having the composition specified in claim 7 is hot-rolled at a slab-reheating temperature or slab-furnace charging temperature of 1,100° C. or higher and a finish rolling temperature of 800° C. or higher, is cooled after the completion of finish rolling such that the residence time in a temperature range of 600° C. to 700° C. is 10 seconds or less in total, and is coiled at an average coiling temperature of 400° C. to lower than 600° C. such that the difference between an average value of coiling temperature in a 100 mm-wide region at a widthwise central position of a coil and an average value of a coiling temperature in a 100 mm-wide region at a lateral edge position of the coil is 70° C. or lower;

a cold-rolling step of cold-rolling a hot-rolled sheet obtained in the hot-rolling step with a cumulative rolling reduction of more than 20%;

an annealing step in which a cold-rolled sheet obtained in the cold-rolling step is heated to 700° C. or lower at an average heating rate of 5° C./s or more, is further heated to an annealing temperature at an average heating rate of 1° C./s or less, and is held at an annealing temperature of 780° C. to 1,000° C. for 30 seconds to 1,000 seconds;

a cooling step of cooling the cold-rolled sheet at an average cooling rate of 3° C./s or more after the annealing step;

a galvanizing step of galvanizing the cold-rolled sheet after the cooling step; and a post-plating cooling step of cooling the galvanized sheet after the galvanizing step such that the residence time in a temperature range of (Ms temperature—50° C.) to the Ms temperature is 2 seconds or more.

12. The method, for manufacturing the high-strength galvanized steel sheet excellent in stretch-flange formability, in-plane stability of stretch-flange formability, and bendability, according to claim 9, the method comprising a galvannealing step of performing a galvannealing treatment by holding in a temperature range of 460° C. to 580° C. for 1 second to 40 second, the galvannealing step being after the galvanizing step and before the post-plating cooling step.

13. The method, for manufacturing the high-strength galvanized steel sheet excellent in stretch-flange formability, in-plane stability of stretch-flange formability, and bendability, according to claim 9, the method comprising a tempering step of performing a tempering treatment at a temperature of 350° C. or lower after the post-plating cooling step.

14. The method, for manufacturing the high-strength galvanized steel sheet excellent in stretch-flange formability, in-plane stability of stretch-flange formability, and bendability, according to claim 12, the method comprising a tempering step of performing a tempering treatment at a temperature of 350° C. or lower after the post-plating cooling step.

15. The method, for manufacturing the high-strength galvanized steel sheet excellent in stretch-flange formability, in-plane stability of stretch-flange formability, and bendability, according to claim 10, the method comprising a galvannealing step of performing a galvannealing treatment by holding in a temperature range of 460° C. to 580° C. for 1 second to 40 second, the galvannealing step being after the galvanizing step and before the post-plating cooling step.

16. The method, for manufacturing the high-strength galvanized steel sheet excellent in stretch-flange formability, in-plane stability of stretch-flange formability, and bendability, according to claim 10, the method comprising a tempering step of performing a tempering treatment at a temperature of 350° C. or lower after the post-plating cooling step.

17. The method, for manufacturing the high-strength galvanized steel sheet excellent in stretch-flange formability, in-plane stability of stretch-flange formability, and bendability, according to claim 15, the method comprising a tempering step of performing a tempering treatment at a temperature of 350° C. or lower after the post-plating cooling step.

18. The method, for manufacturing the high-strength galvanized steel sheet excellent in stretch-flange formability, in-plane stability of stretch-flange formability, and bendability, according to claim 11, the method comprising a galvannealing step of performing a galvannealing treatment by holding in a temperature range of 460° C. to 580° C. for 1 second to 40 second, the galvannealing step being after the galvanizing step and before the post-plating cooling step.

19. The method, for manufacturing the high-strength galvanized steel sheet excellent in stretch-flange formability, in-plane stability of stretch-flange formability, and bendability, according to claim 11, the method comprising a tempering step of performing a tempering treatment at a temperature of 350° C. or lower after the post-plating cooling step.

20. The method, for manufacturing the high-strength galvanized steel sheet excellent in stretch-flange formability, in-plane stability of stretch-flange formability, and bendability, according to claim 18, the method comprising a tempering step of performing a tempering treatment at a temperature of 350° C. or lower after the post-plating cooling step.

* * * * *